No. 856,447. PATENTED JUNE 11, 1907.
F. D. G. COOK.
AUTOMOBILE TIRE.
APPLICATION FILED OCT. 8, 1906.
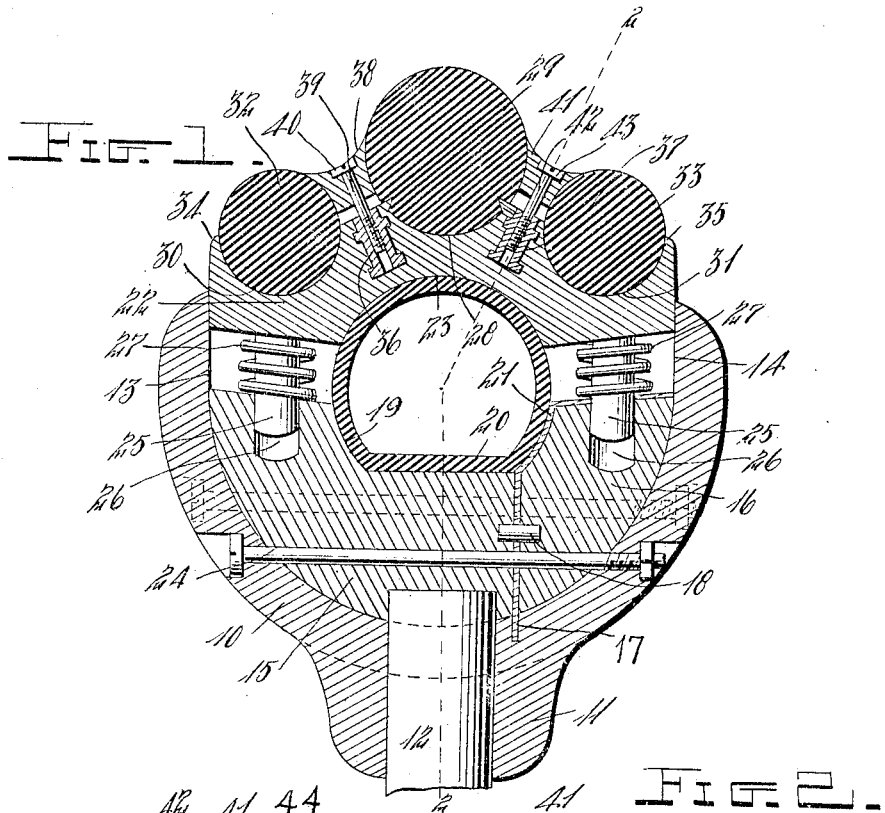
Witnesses
Inventor
Frederick D. G. Cook,
by H. B. Willson & Co.
Attorneys

UNITED STATES PATENT OFFICE.

FREDERICK D. G. COOK, OF CHIPPEWA FALLS, WISCONSIN.

AUTOMOBILE-TIRE.

No. 856,447.　　　　Specification of Letters Patent.　　　　Patented June 11, 1907.

Application filed October 8, 1906. Serial No. 338,040.

*To all whom it may concern:*

Be it known that I, FREDERICK D. G. COOK, a citizen of the United States, residing at Chippewa Falls, in the county of Chippewa and State of Wisconsin, have invented certain new and useful Improvements in Automobile-Tires; and I do declare the following to be a full, clear, and exact description of the invention, such as will enable others skilled in the art to which it appertains to make and use the same.

This invention relates to yieldable tires for automobiles and like vehicles, and has for its object to improve the construction and increase the efficiency of devices of this character.

With these and other objects in view, the invention consists in certain novel features of construction, as hereafter shown and described and specifically pointed out in the claims.

In the accompanying drawings forming a part of this specification and in which corresponding parts are denoted by like characters, is illustrated the preferred form of the embodiment of the invention capable of carrying the same into practical operation.

In the drawings, Figure 1 is a transverse section of the rim of an automobile wheel and a transverse section of the improved tire applied thereto. Fig. 2 is a section on the line 2—2 of Fig. 1.

In the improved apparatus are comprised a main base rim member, an outer rim member and an intermediate rim member, the latter being in two parts suitably united, and for the purpose of this description, these parts will be referred to as above noted. The main base rim member is represented at 10, preferably of steel and with sockets 11 at suitable intervals to receive spokes 12, if the device is applied to rims in which spokes are employed.

The rim 10 is formed with its inner portion semi-circular and with its sides extending parallel for a distance at their terminals as illustrated at 13 and 14.

Fitting within the steel rim 10, is the intermediate rim, preferably of wood, and formed in two parts 15 and 16, and divided circumferentially of the rim and at one side of its center as represented at 17, the two parts 15—16 being provided at suitable intervals with studs or pins 18, to prevent the two-part intermediate rim from "creeping" under the severe strain to which they will be subjected.

The two-part intermediate rim 15—16 is provided with an encircling channel 19 in which an inflatable tire member 20 bears, as hereafter explained. The smaller intermediate rim member 16 is provided with a sheet metal lining 21 preferably of steel, to increase the strength of the device. The two-part tire member 15—16 is further secured by bolts 24 at suitable intervals.

Fitting between the parallel sides 13—14 of the outer steel rim is the outer rim member 22 of aluminium, hard wood, or like suitable material, and provided with an inner channel 23 for bearing over the outer face of the inflatable tire member 20.

The outer face of the two-part rim member 15—16 is inclined inwardly, and the inner face of the rim member 22 is correspondingly inclined, and provided with pins 25 at suitable intervals fitting into sockets 26 within the two-part rim member 15—16, the pins being surrounded by springs 27, so that the rim member 22 is yieldable relative to the other parts of the structure.

The outer face of the rim member 22 is provided with a plurality of channels, a central channel 28 to receive the solid rubber tire member 29, and smaller channels 30—31 at each side of the central channel 28 to receive smaller rubber tire members 32—33, the larger central tire member projecting for some distance beyond the smaller tire members 32—33, the object to be hereafter explained.

The rim member 22 projects at its edges beyond the centers of the tire members at 34—35, to assist in holding them in place upon the rim member 22.

The portions of the rim member 22 which comes between the tire member 29 and tire member 32, and between the tire member 29 and tire member 33 are less in extent than the edges 34—35, and are provided at these points with threaded sockets 36—37, the sockets being rigidly embedded in the rim member 22, as shown.

Fitting between the tire members 29 and 32 are chocks 38, preferably of steel or like material, and each provided with an aperture through which a bolt 39 passes with its inner threaded end engaging the threaded sockets 36, the outer ends of the bolts having heads 40 embedded in suitable cavities in the chocks. Fitting between the tire members 29 and 33 are similar chocks 41 through which bolts 42 pass with their threaded ends engaging the sockets 37 and with the heads 43 of the bolts embedded in suitable recesses in their chocks. The heads 40—43 of the bolts are provided with wrench heads or screw driver recesses to enable them to be operated.

The chocks 38—41 extend laterally for a distance over the tire members 29, 32 and 33 beyond their center lines, as shown, and thus serve to bind the tire members upon the rim member 22, in co-action with the inwardly extending edges 34—35, as shown in Fig. 1.

As many of the chocks 38—41 may be employed as required, and spaced at suitable distances apart, with the spaces between the chocks occupied by filler members of suitable material such as hard rubber, as represented at 44 in Fig. 2.

By this arrangement, it will be obvious that with a device thus constructed and applied, the pressure will be borne very largely by the central solid rubber tire member 29 when running upon hard pavements or hard roads, but when running over soft roads or in sand and like material, the sinking of the tire therein will cause the smaller flanking tire members 32—33 to bear upon the road, and thus not only increase the tractive force, but likewise prevent the tire from sinking into the ground.

The inner inflatable tire member 20 together with the springs 27 insure a requisite yieldableness of the tire, as will be obvious.

A tire thus constructed can be cheaply renewed when worn or broken, as the parts which are subjected to the greatest wear, and are liable to be broken are the relatively cheap portions 29, 32 and 33.

It will be noticed that it will be impossible to puncture this improved tire, as the only part subject to puncture is the inflatable member 20, which is effectually protected by the relatively heavy rim member 22 and a steel rim member 10.

Having thus described the invention, what is claimed is:—

1. A vehicle wheel comprising a channeled rim, an intermediate rim member seated in the channeled rim and provided with a peripheral groove and with sockets disposed at intervals on opposite sides of said groove, an outer rim member encircling and spaced from the intermediate rim member and provided on its inner face with a groove extending parallel with the first-named groove, an inflatable elastic tube arranged between the outer and intermediate rim members and seated in the grooves, studs projecting inwardly from the inner face of the outer rim member and slidably disposed in the several sockets, compressible springs arranged on the studs between the rim members, and a tire applied to the outer face of the outer rim member.

2. In a vehicle wheel, a channeled rim, an outer rim member encircling said rim and spaced from the bottom wall of the latter, cushioning means interposed between the rim and outer rim member, a plurality of spaced tires applied to the outer face of the latter, threaded sockets embedded in the rim member at intervals and on lines between the spaced tires, retaining blocks fitted between and engaging the opposing walls of the spaced tires at points in line with the sockets, and clamping screws entered through the retaining blocks and engaged with the several sockets.

3. In a vehicle wheel, a channeled rim having a filling, an outer rim member applied around said rim and spaced at its inner face from the periphery of the filling, cushioning members interposed between the filling and rim member for yieldably supporting the latter, a main central tire applied to the rim member and forming the thread thereof, and auxiliary tires applied to the rim member respectively at opposite sides of the main tire, said auxiliary tires being disposed in the plane of a circle of smaller diameter than that of the main tire.

4. In a vehicle wheel, a channeled rim, an inner rim member seated in said channel and comprising a pair of separable sections, transversely-projecting pins carried by one of the sections and entering sockets provided in the other to fix the sections against relative creeping movement, a tie bolt extended transversely through the rim in engagement with the rim member, sockets provided in the outer face of the latter, an outer rim member spaced from the intermediate rim member and having studs movably arranged in said socket, springs coiled upon the studs between the opposing faces of the rim members for yieldably sustaining the outer rim member, and a tire applied around the outer face of the latter.

In testimony whereof I have hereunto set my hand in presence of two subscribing witnesses.

FREDERICK D. G. COOK.

Witnesses:
DAYTON E. COOK,
S. H. COOK.